No. 1,998. REISSUED JUNE 13, 1865.
H. BURDEN.
MACHINE FOR MAKING HORSESHOES.
5 SHEETS—SHEET 1.
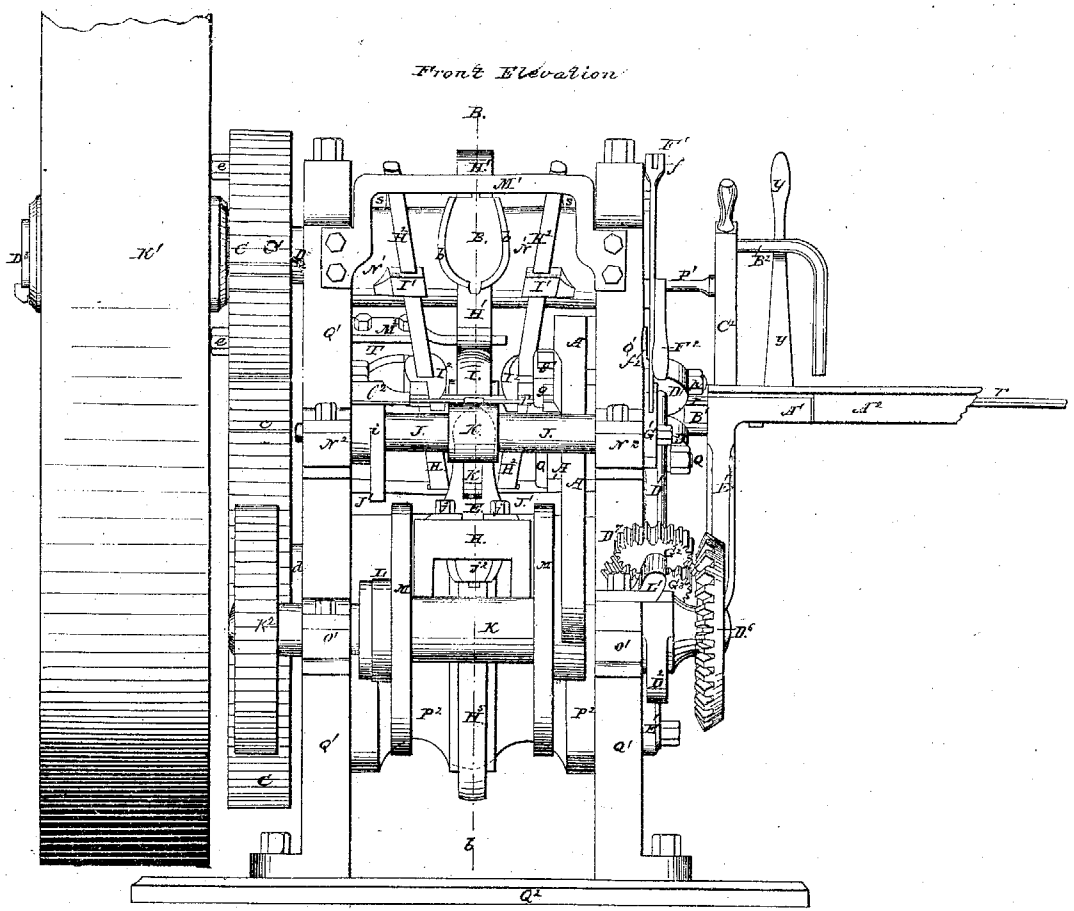
Witnesses:
Jno. J. Wightman
W. L. Benneen.
Inventor.
Henry Burden
by his attorney
E. S. Renwick.

No. 1,998. REISSUED JUNE 13, 1865.
H. BURDEN.
MACHINE FOR MAKING HORSESHOES.
5 SHEETS—SHEET 2.
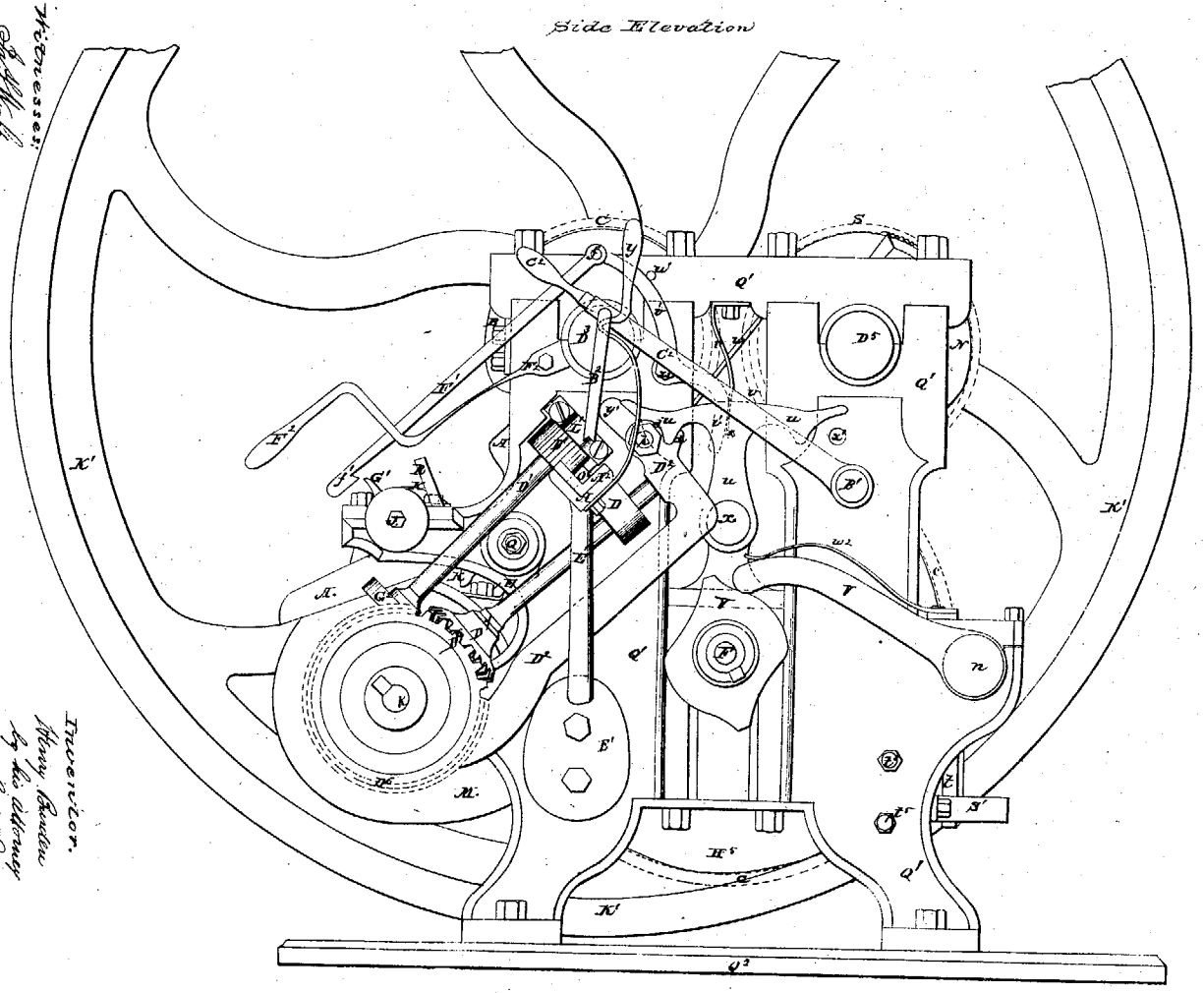
Witnesses:
Sa. J. Wightman
W. L. Bennem.
Inventor.
Henry Burden
by his Attorney
C. S. Renwick.

No. 1,998. REISSUED JUNE 13, 1865.
H. BURDEN.
MACHINE FOR MAKING HORSESHOES.
5 SHEETS—SHEET 3.
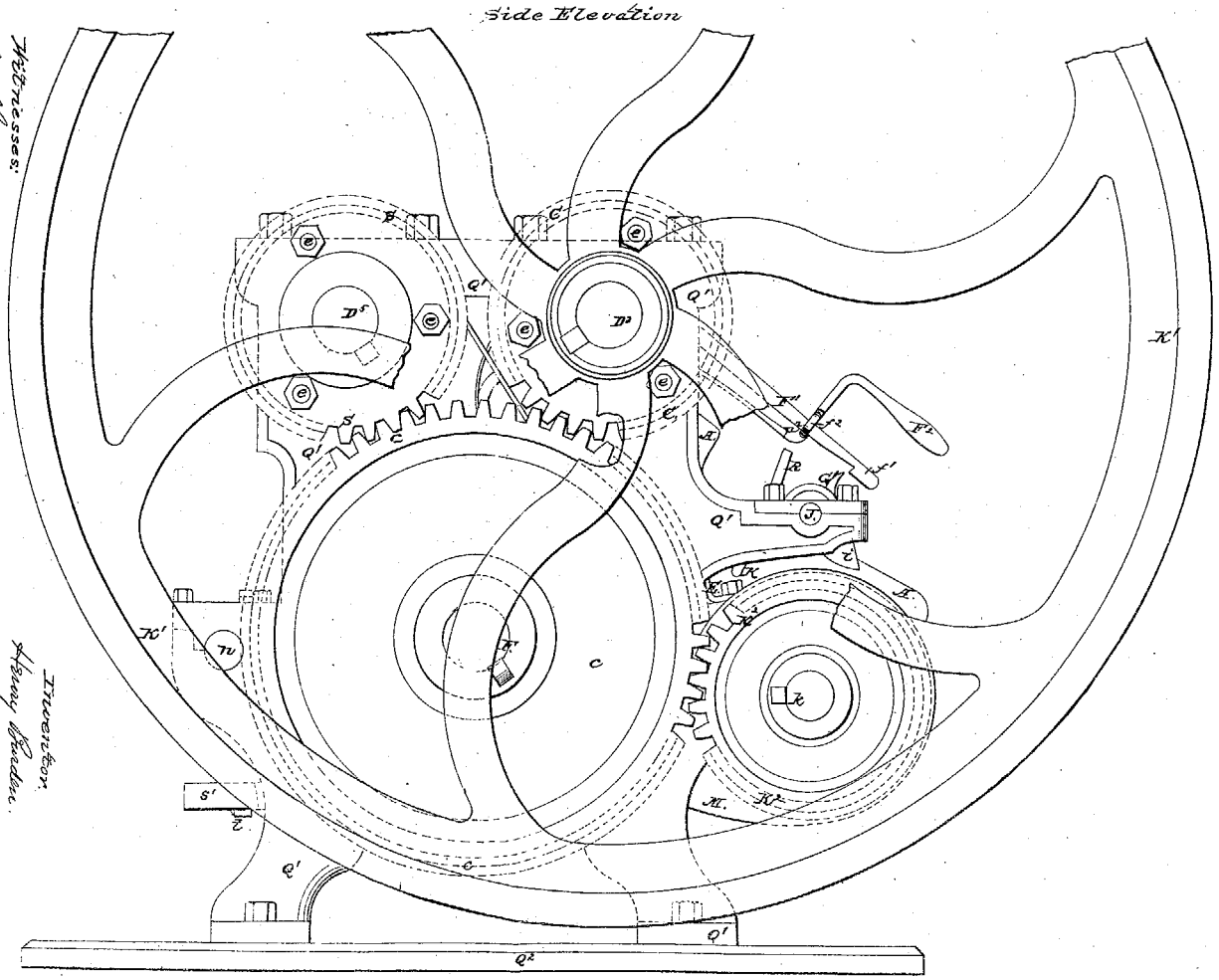
Witnesses:
Jos. Weightman.
H. L. Benson.
Inventor.
Henry Burden.
by his Attorney
C. S. Renwick.

No. 1,998. REISSUED JUNE 13, 1865.
H. BURDEN.
MACHINE FOR MAKING HORSESHOES.
5 SHEETS—SHEET 4.
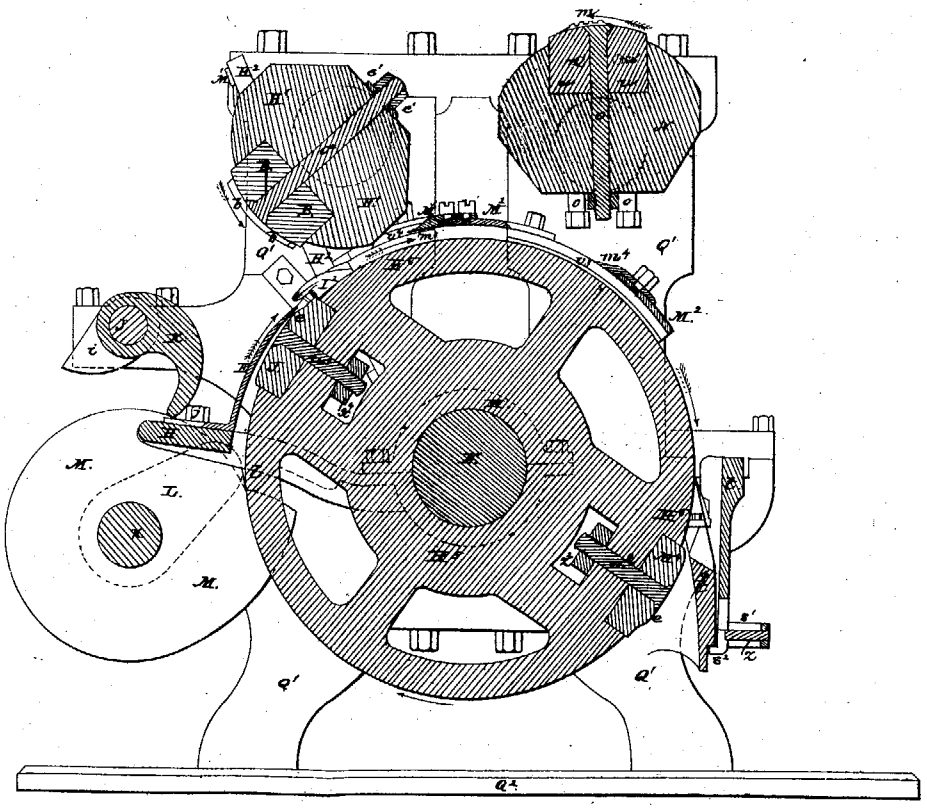
Section at B. Plate I.
Witnesses:
Geo. J. Wightman
W. D. Bennett
Inventor.
Henry Burden
by his Attorney.
E. S. Renwick.

No. 1,998. REISSUED JUNE 13, 1865.
H. BURDEN.
MACHINE FOR MAKING HORSESHOES.
5 SHEETS—SHEET 5.
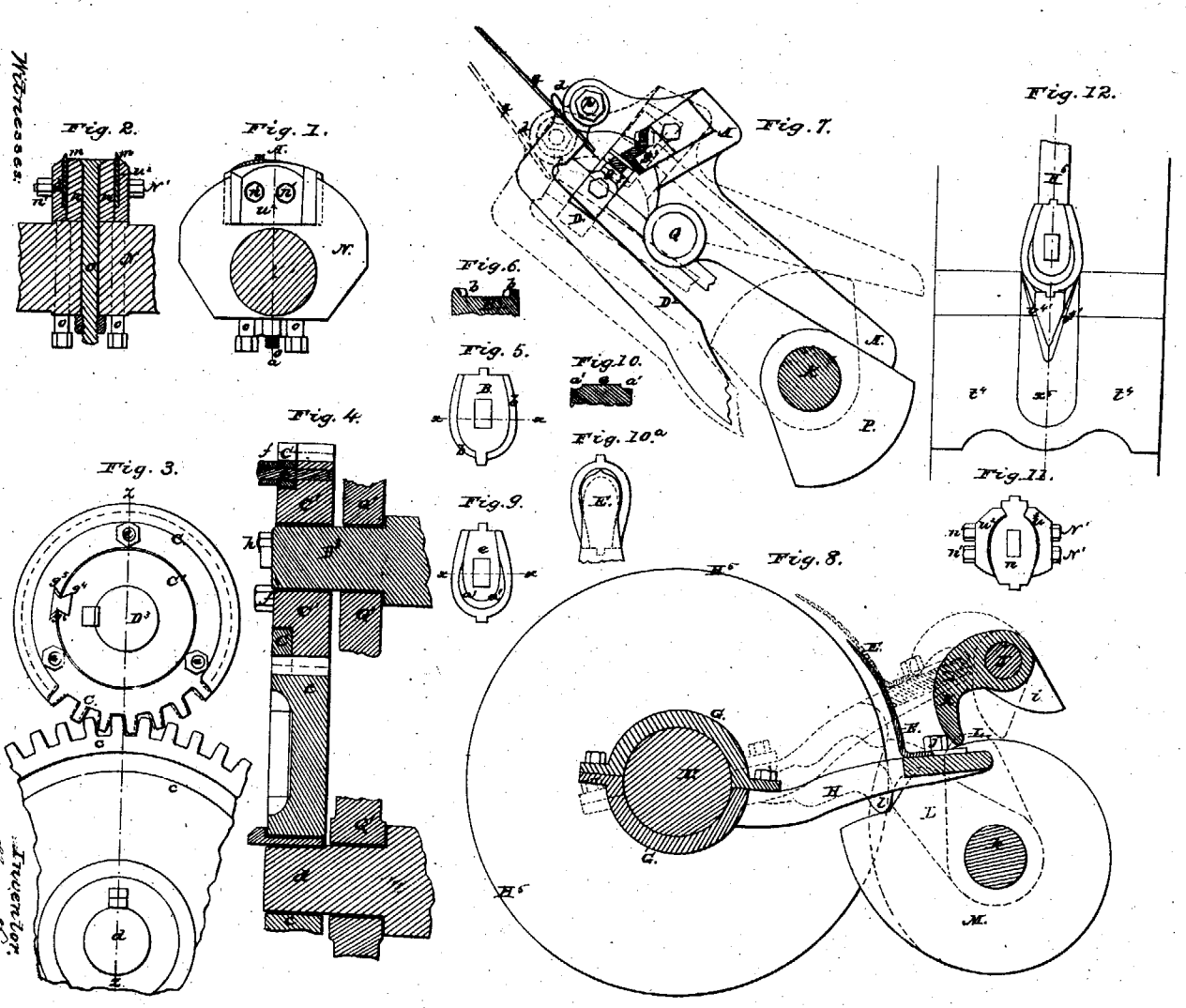
Witnesses:
Jas. F. Wightman
W. H. Benton
Inventor.
Henry Burden
by his attorney
S. S. Fenwick

UNITED STATES PATENT OFFICE.

HENRY BURDEN, OF TROY, NEW YORK.

IMPROVEMENT IN MACHINES FOR MAKING HORSESHOES.

Specification forming part of Letters Patent No. 17,665, dated June 30, 1857; Reissue No. 1,998, dated June 13, 1865.

*To all whom it may concern:*

Be it known that I, HENRY BURDEN, of the city of Troy, county of Rensselaer, and State of New York, have invented certain new and useful Improvements in Machinery for Making Shoes for Horses and Mules; and I hereby declare that the following is a full and exact description thereof, reference being had to the annexed drawings, Plates I, II, III, IV, and V. They have all been made to a scale of two inches to the foot, and correctly represent the form and sizes of the several parts in the different drawings.

My machine is designed to take long rods, such as are discharged from the rolling-mill, and make them into horseshoes, complete except the punching, automatically, and deliver them in the room or place where they are to be punched. Such rods are usually rolled square in their cross-section, and of a size adapted to the size of the shoe to be made. After being heated they are placed in a trough made of cast iron or other suitable material. A portion of the trough is represented at A′ A², Plates I and II. It is most conveniently made in sections of about twelve feet each. The end nearest the machine is supported by a standard, E′, attached to the side of the machine by two bolts. The other portions may be supported by legs or other appropriate means.

The successive operations of my machine upon the rod are as follows: First, a portion of it, of suitable length to form the shoe, is drawn into the machine and cut off. It is then bent around a form into the shape of the letter U. It is next placed in its proper position between the swaging-dies. The heels of the shoe are bent still farther inward, while it next passes between the two revolving swaging-dies that compress and roll it into proper shape. Then it is creased and partially punched, and finally it is taken from the dies and flattened and dropped in a finished state upon a revolving chain that deposits it in the room where the punching is completed. While one shoe is being creased and punched, another portion of the rod is drawn into the machine, and thus it proceeds continuously. The means of performing these several operations will be described in their order.

The feeding apparatus consists, mainly, of two rollers, D and D′. They revolve continuously, and are connected by two equal spur-wheels, G² and G³, upon their shafts near the lower journals. The upper one is fixed in its position, the lower one may approach or recede from it, and when they are so near as to embrace the rod it is fed into the machine; when farther apart, their action upon the rod ceases. The bearings of the upper shaft are fixed on projections L′ and L′, cast or attached to the frame. Those of the lower shaft are in a movable frame, D²-D², which has its center of motion on the shaft *k*. The other end of this frame is attached to and receives its motion from the short arm of the cutting-lever A A A, Plates I, II, and V. The connection is made by means of an arm extending from one to the other through the frame, with shoulders on the inside and screws with nuts *p p* on the outside. A slot, *y′*, is made in the frame, of sufficient length to allow the motion of the arm, and also a hole, O⁵, for the passage of the rod. The bevel wheels D⁵ and D⁶, with teeth in the proportion of one to two, communicate motion to the feeding-rolls from the shaft *k*.

To cut off the rod a stationary cutter, *g*, Fig. 7 and Plate V, is attached by a screw-bolt to a projection on the inside of the frame in such a position that the rod slides over it on its passage to the machine. The movable cutter *g′* is affixed by a screw-bolt to the cutting-lever A A, which has its fulcrum at Q, attached to the inside of the frame. Its long arm rests upon the cam P, which revolves with the shaft *k*, and, when raised thereby, the upper cutter is brought down upon the rod and cuts it off. At the same time the lower feeding-roll recedes from the upper and suspends the feeding-action. A spring, *w*, aids the weight of the arm to raise the cutter after the rod has been cut off, and to recommence the feeding action by pressing the lower feeding-roll against the rod. The position of the rod in the machine previous to cutting is determined by the stop O², against which the end of the rod is pushed previous to the action of the cutters.

Connected with the feeding apparatus are both a self-acting device to stop its action when a portion of the rod remains too short to form a perfect shoe, and also a means to commence the feeding at the right time, with reference to the other machinery, when a new rod is to be fed into the machine. To effect the former object is, first, the T-shaped catch *u u u*, fully shown in Plate II. It moves easily upon its center, X, and in a perpendicular position its two arms balance each other. When it is inclined to the right and rests upon its stopping-pin $x'$, it has no effect upon the feeding rolls; but when it is inclined to the left, as represented in the drawings, it catches the projection *d* on the movable frame $D^2$, and holds the upper cutter down and the feeding-rolls apart. An indicator, $B^2$, attached to the arm $C^2$, that moves easily on its bearings $B'$, slides upon the heated rod as it passes under it into the machine. Its distance from the feeding-rolls is just equal to the length of rod required to form a shoe, and when less than that quantity passes from it to the rolls it slides over the end of the rod, drops down through a hole in the feeding-trough, and at the same time a pin, $P'$, Plate I, projecting from the arm $C^2$, strikes against the catch, and inclines it into a position to prevent the further action of the feeding-rolls.

The feeding action will recommence on disengaging the catch; but it is manifest that this must be done during the time that the cam P would hold the feeding-rolls apart, otherwise a portion of the rod would be fed into the machine less than enough to make a perfect shoe, and injury might result to the machinery, and, as the unlocking at the right moment, when the machinery is in rapid motion, could not safely be intrusted to the attendant, it is necessary that it should be done by the machine itself, and for this purpose there is provided the lever $v'$, having its fulcrum at $x^2$ on the side of the machine. Its lower arm, when moved, presses against the pin (dotted *x*) on the catch, and forces it back. A spring, *v*, holds it forward, and presses the other arm of the lever against the stop $u'$ to prevent any interference with the catch when not required. At the end of the lever $v'$ is attached the connecting-rod $F'$ by a joint at *f*. It has a notch at $f'$, which, when caught by the projection $G'$ on the rocking shaft J, (the motions of which are at the right time for this purpose), moves the lever $v'$, and unlocks the catch. The lower end of the connecting-rod is supported by a loop, $f^2$, on the side of the spring-handle $F^2$, which holds it out of contact with the projection $G'$, unless the handle is pressed down by the operator.

When a new rod is to be fed into the machine, the attendent raises the indicator until it is caught and held up by the spring *y*. He takes the scrap from the machine and moves the rod up against the cutter. Then the indicator is let down upon it, and, placing his hand upon the handle $F^2$, holds it down to the stop R until at the proper moment the projection $G'$, catching into the notch $f'$, unlocks the feeding-rolls, and their action recommences.

The means of bending the portion of the rod that forms the shoe, which are next to be described, are most fully represented in Plates I and IV and Fig. 8, Plate V. The rod, when it is fed into the machine, passes into the movable guides or holders $I^2$ $I^2$, against the stop $O^2$, and in front of the bending-tongue E, and when it is cut off they hold it in its place. These guides are fully represented in Plate I, supporting the rod on three sides. There are two, one on each side of the large roll $H^5$, and they are sustained by movable standards $H^2$ $H^2$, for purposes hereinafter mentioned. Immediately after the rod is cut off the bending-tongue E, having a small projecting edge in front, as shown by the dotted lines in Plate I, to prevent the rod from slipping, moves up against the center of the rod, and carries it forward between the holders until the rod is bent round the tongue into the desired shape. The frame H, to which the tongue is attached by screw-bolts, has two legs, one on each side of the great roll $H^5$, terminating in rings fitted to rock on the shaft F. Its motion forward is given by two cams, M and M, on the shaft *t*, which bear against the small wipers *l* and *l* in the frame. To insure its backward motion, an arm, K, proceeding from the rocking shaft J, and resting on the frame H, is raised by it until the bending-tongue has been moved forward to the required position, (as will be hereinafter described,) when the cam L on the shaft *k* strikes against the other arm, *i*, projecting from the shaft J, and forces back the frame and bending-tongue.

On the periphery of the large roll $H^5$ are two swaging dies, $J^2$ and $M^4$, placed opposite to each other, and alike in all respects. Their surfaces are fitted to impress upon the upper side of the horseshoe the precise form which it is desired to give it. It is shown in Figs. 9 and 10 on Plate V. The central portion, *e*, the sides of which give shape to the inner edge of the shoe, is elevated above the rest as much as the thickness of the finished shoe, and the convex fillet $a'$ $a'$ is the counterpart of the concave of the shoe. The surface of the upper swaging-die, B B, is fitted to make the plane even surface of the under side of the shoe, and, as the inner side is properly made thinner than the outside, the natural tendency of the swaging process is to force the rod out from under the swages. This is prevented by making upon the upper die a flange, *b b*, projecting downward to nearly the thickness of the shoe, and, except at the toe, embraces it entirely on the outside. The tendency to straighten is thus entirely prevented, and a smooth and perfect surface given to the outer side of the shoe. It is cast with the die, so that both constitute one piece, and is best represented in Figs. 5 and 6, Plate V.

The cams M M are so formed that the forward motion of the bending-tongue commences when that portion of the lower die which forms the toe of the shoe has attained its proper relative position with reference to the point of the tongue. It then moves forward with the die, as if it formed part of it, and the rod, when bent around it, is directly over the position at the toe it should occupy on the die.

Horseshoes are properly made wider at the toe than at the heels, and the front of them much thicker than the interior beveled edge. The bending of the rod into a U form has a tendency to compress and thicken the interior side, and to stretch and reduce the outer side contrary to what is desired in the finished shoe. Several attempts have heretofore been made to swage horseshoes by passing the blank bent into a U form between revolving or rolling swaging-dies. The most prominent of these is the device patented to Brazella Young and Samuel Titus in the year 1837. In all these the blank has been bent around the central elevated portion of die, and remained in contact with it during the attempt to swage it. The iron in swaging was consequently forced against such elevated part, and usually strained or broke some part of the machine, or, forcing the rolls apart, escaped over the top of such elevated part of the die, and formed a fin upon the inside of the shoe. Much labor and expense have been bestowed upon such fruitless experiments. The real cause of the difficulty seems not to have been apprehended, nor was it in any way removed previously to my invention. I have, however, completely remedied it and made such swaging of the shoes practical by placing the bent blank a little in advance of such central elevated part of the die, so that when first gripped there shall be a space between such blank and such elevated part sufficient for the iron to be spread backward as much as desired without coming in contact with it. And with this view the bending-tongue is so made and adjusted that when it moves forward with the die the front part of it is in advance of the front part of such central elevated part of the die, as shown in Fig. $10^a$, Plate V. The extent of such advance and consequent space between the blank and elevated portion should accord with the size and shape of the shoe to be made, and is best determined by a few trials with the machine. The tongue is made adjustable for that purpose by putting packing between it and the frame to which it is attached before it is screwed down to its place. Immediately after the toe of the shoe has been caught between the swaging dies the bending-tongue is drawn back out of the way by the arm before described to allow the iron to be spread backward, as hereinbefore stated. At the same time the two cams *s s* on the shaft N′ are brought in contact with the guides I′ and I′ upon the movable standards $H^2$ and $H^2$, and these cause the guides or holders $I^2$ $I^2$ to approach each other and press the ends of the shoe against the elevated central portion of the lower die, and within the flange on the upper die. The standards are attached at the bottom by a joint to the arms J′ and J′ cast upon the inside of the frame. At the top they slide on the cross-piece M′. Another cam, *e′ e′*, Plate IV, moves back the holders to their first position after the bent bar has passed by them.

Instead of making the swaging-dies upon the surfaces of the rolls H′ and $H^5$, I make them in separate pieces, as in my former horseshoe-machine, and described in my patents of 1835 and 1843, and attach them to those rolls by bolts and screws. They can thus be readily repaired or "shifted" to make different forms and sizes of shoes. A recess is cast in the periphery of the rolls, as shown by Plate IV. Into this the dies are accurately fitted. Slots or mortices are also made in the rolls, into which the tenons at the ends of the dies shown in Figs. 5 and 9, Plate V, accurately fit and prevent their lateral displacement. A bolt with a countersunk head passes through the middle of each die and into the roll and fastens it by a screw and nut on the other side.

After passing between the dies, the shoe is liable to adhere to the upper die, by which great injury may result to the machinery. It is therefore indispensable to the practicability of the machine that means should be provided to make the shoe adhere with certainty to the lower die and pass on to be subjected to the next operation. Two projections, $v^1$ and $v^3$, Plate IV, are cast upon the frame of the machine. To these is attached by screws and bolts an arm, $M^2$, Plates I and IV, and to this arm is screwed what I term the "scraper" $m^3$. This is made of steel, and its front edge scrapes along the surface of the upper die and separates from it the shoe. A portion of the flange at the toe is cut away to admit its passage. The elevated portion of the under die passes nearly in contact with its under surface. A similar device takes the shoe from the creasing and punching die.

The last-named die, to which the shoe is next subjected, is made in parts, as specified in my said former patents, that the creases *m* and *m* may be replaced or shifted to other sizes and forms. Its construction will be readily seen from Figs. 1, 2, and 11, Plate V. The creases are firmly held by the clamps $u^2$ $u^2$ on the outside, and drawn together by bolts with heads N′ on one side and nuts *n′* and screws on the other. Two adjusting-screws, *o* and *o*, regulate the depth of the creases and holes.

It is essential that the upper and lower dies should accurately meet each other in their proper relative positions. In my former horseshoe-machines adjusting-screws were provided at the ends of the dies, but they did not hold them to their places so firmly and securely as the mode adopted in this machine. Besides, they are liable to be displaced by the wearing of the cogs on the gearing, and what is termed "back-lash." I have devised a new mode of effecting the adjustment and providing for wearing. The cog-wheels C and S are made in two sections. Those of the wheel C are represented at C and C′, Figs. 3 and 4, Plate V, and at the same letters on Plate I. The section C is movable on C′, and the two are held together by three bolts, *e e* and *e*, with heads on one end and screws and nuts on the other. Slots are made for the passage of the bolts through C, so as to admit the requisite motion. A projection, $g^4$, is dovetailed into or cast upon the section C′, and extends into the mortise on section C. Two wedges, $q^5$ and $q^5$, are fitted into the mortise, one on each side of the projection $g^4$, so that by loosening one and driving the other the relative position of the sections may be changed, and thus the dies adjusted and the back-lash prevented. It remains to take the shoe from the lower die, and, as it has the curve of the surface of that die, to flatten it.

A brace, $t^4$, Plate IV, and Fig. 12, Plate V, is placed between the two sides of the frame, to which it is attached by bolts and screws $t^5$, Plate II, and helps to support them. A portion of it, $x^5$, is made plain, and the shoe is flattened by being pressed against it by the flattener *t*. To the brace are attached two scrapers, $V^{4\prime}$ and $V^{4\prime}$, having an edge on the inside of each that scrapes the surface of the lower die, (permitting the elevated portion to pass between them.) They thus take the shoe from it and conduct it down between the sides of the flattener onto the projection $s^2$ at its lower end. The flattener is attached to the shaft *n*, Plate II, at the end of which is fixed the lever U, pressed by the spring $W^2$ against the cam V, which, being connected with the shaft F of the big roll, revolves with it and gives to the flattener the requisite motion. A strap, S′, is attached to the brace to hold the pin Z, extending into a slot in *t*. Owing to the shape of the cam, the flattener is first held open sufficient to receive the shoe. Then it closes to flatten the shoe. Then it opens so wide that the pin Z pushes the shoe off from the projection $S^2$, and it drops upon the endless chain to be carried to the storehouse.

The form of the frame Q′, attached to the bed-plate $Q^2$, and the arrangement of the gearing are fully shown by the drawings.

The machine is driven by the belt on the large fly-wheel.

The wheels S, C′, and $K^2$ are each one half the diameter of C, and revolve twice, making two shoes to one revolution of the latter.

What I claim as new in the above-described machinery, and desire to secure by Letters Patent, is as follows:

1. The above-described feeding apparatus, and in connection therewith the mode set forth of cutting off the rod, and the combination of the same with the devices for bending and swaging the shoe, by which combination the rod is cut into suitable lengths and fed into the machine automatically, and also the self-acting device for stopping the feeders, and the mode of renewing their action at the proper time.

2. In machines for making horse and mule shoes with rolling swaging dies, the placing of the blank in advance of the central elevated part of the die, so as to make a space sufficient for the iron to be spread backward toward such central elevated part of the die in the act of swaging, substantially as described.

3. A flange on the upper die, when said die and flange are used independently of any mechanism for creasing and punching the shoe, such flange being formed by casting it with and as part of the die, substantially as described.

4. The combination of a revolving creasing and punching die with the revolving swaging-dies, by which both operations are successively and automatically performed.

5. The device set forth for taking the shoe from the upper and confining it to the lower dies, and finally taking it from the lower dies and conducting it to the flattener.

6. The means described for flattening the shoe, and their combination with rolling swaging dies, by which the flattening of the shoe is automatically performed.

7. The combination and arrangement of machinery by which the several processes above described are performed successively by by one machine, and without aid from attendants.

8. I do not mean to limit myself to the precise means of performing the operations above set forth, as they evidently admit of many variations; but I claim those devices or their equivalents which shall effect the same purpose in substantially the same way.

In testimony whereof I have hereto set my hand.

HENRY BURDEN.

Witnesses:
W. L. BENNEM,
E. S. RENWICK.